United States Patent
Bang et al.

(10) Patent No.: US 8,677,500 B2
(45) Date of Patent: Mar. 18, 2014

(54) DIGITAL BROADCASTING RECEIVER FOR PROTECTION OF BROADCASTING CONTENTS AND THE METHOD THEREOF

(75) Inventors: Gun Bang, Daejeon (KR); Hyon Gon Choo, Busan (KR); Je-Ho Nam, Seoul (KR); Bum Suk Choi, Daejeon (KR); Young Bae Byun, Seoul (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1365 days.

(21) Appl. No.: 11/996,154

(22) PCT Filed: Jul. 20, 2006

(86) PCT No.: PCT/KR2006/002855
§ 371 (c)(1),
(2), (4) Date: Jul. 15, 2008

(87) PCT Pub. No.: WO2007/011177
PCT Pub. Date: Jan. 25, 2007

(65) Prior Publication Data
US 2011/0228880 A1    Sep. 22, 2011

(30) Foreign Application Priority Data

Jul. 20, 2005  (KR) .......................... 10-2005-0066032
Jul. 19, 2006  (KR) .......................... 10-2006-0067300

(51) Int. Cl.
*H04L 29/06* (2006.01)

(52) U.S. Cl.
USPC .......................................................... 726/26

(58) Field of Classification Search
USPC .................................. 726/26, 2, 27; 380/200
See application file for complete search history.

(56) References Cited

U.S. PATENT DOCUMENTS

| 6,070,198 | A | * | 5/2000 | Krause et al. ................. | 719/321 |
| 6,986,048 | B1 | * | 1/2006 | Epstein et al. ................. | 713/176 |
| 7,340,745 | B2 | * | 3/2008 | Waldorf ......................... | 719/328 |

FOREIGN PATENT DOCUMENTS

| EP | 1 286 262 | A1 | | 2/2003 |
| EP | 1286262 | A1 | * | 2/2003 |
| KR | 1020040057742 | A | | 7/2004 |
| WO | 2005/062532 | A1 | | 7/2005 |

OTHER PUBLICATIONS

Ji Ming et al, ISO/IEC JTC 1SC 29/WG11 N4405.*
MPEG Multiimedia Middleware: Context and Objective, Jan. 1, 2005.*
Ji Ming et al. ISO/IEC JTC 1SC 29/WG11 N4405.*
MPEG Multimedia Middleware: Context and Objectiv, 01-012005.*
Microsoft Computer Dictionary.*

(Continued)

*Primary Examiner* — Ali Abyaneh
(74) *Attorney, Agent, or Firm* — Ladas & Parry LLP (57) ABSTRACT

Provided are a digital broadcasting receiver and method of broadcast content protection. The digital broadcasting receiver comprises a platform which stores received broadcast data, middleware which comprises an application manager managing various applications so that broadcast content corresponding to the received broadcast data is used according to a consumption policy, a platform interface unit which acts as an interface between the platform and the middleware, and a middleware interface unit which acts as an interface between the various applications and the middleware. According to the method, various broadcast content protection and management policies can be accepted in various digital broadcasting receivers, each having different hardware and software structures.

18 Claims, 5 Drawing Sheets

(56) References Cited

OTHER PUBLICATIONS

Newton's Telecom Dictionary.*
Ji Ming et al. ISO/IEC JTC 1SC 29/WG11 N4405, Dec. 2001.*
MPEG Multimedia Middleware: Context and Objective, Mar. 2004.*
Microsoft Computer Dictionary, Third Editon, 1997.*
Newton's telecom Dictionary, 2004.*
Takanori Senoh, et al: "DRM Renewability & Interoperabiilty", Consumer Communications and Networking Conference, 2004 IEEE, Jan. 5-8, 2004, pp. 424-429.
HweeHwa Pang, et al; "Evaluation of MPEG-4 IPMP Extension", Accoustics, Speech, and Signal Processing, 2005. Proceedings. (ICASSP '05). IEEE International Conference on, Mar. 18-23, 2005, vol. 2, pp. ii/1161-ii/1164.
KwangYong Kim, et al; "The Architecture of MPEG-4 Based IPMP Authoring System", Multimedia and Expo, 2004. ICME '04. 2004 IEEE International Conference on, Jun. 27-30, 2004, vol. 1, pp. 447-450.

International Search Report mailed Oct. 30, 2006; PCT/KR2006/002855.
Hendry, et al; "A Dynamically Configurable Multimedia Middleware", Jan. 1, 2005, Advances in Multimedia Information Processing-PCM 2005 Lecture Notes in Computer Science; LNCS, Springer, Berlin, DE pp. 735-746, XP019024098, ISBN: 978-3-540-30040-3 the whole document.
"MPEG Multimedia Middleware: Context and Objective", ITU Study Group 16-Video Coding Experts Group—ISO/IEC MPEG & ITU-T VCEG(ISO/IEC JTC1/SC29/WG11 and ITU-T SG16 Q6), xx, xx, No. N6335, Mar. 21, 2004, XP030013238, paragraphs [01.1]-[01.3]; figure 1.
Ji Ming, et al; "IPMP framework on MPEG-2 Systems", ITU Study Group 16—Video Coding Experts Group—ISO/IEC MPEG & ITU-T SG16 Q6), XX, XX, No. 4405, Dec. 12, 2001, XP030012013, pp. 2,5-8,12; figure 1, pp. 19-22.
European Search Report: dated Mar. 25, 2011; EP 06 78 3366.

* cited by examiner

```
MmIIPMPTool.idl

/**
 * This interface is for IPMP tool processing operation.
 *
 **/ typedef ByteArray IPMPtoolInstance ;
typedef struct IPMPDescriptor // Data type for IPMP Descriptor
{
        uint descriptor_tag;
        uint descriptor_length;
        guid IPMP_Descriptor_ID;
        guid128 IPMP_ToolID;
        uint ControlPoint;
        uint SequenceCode;
        int IPMP_Data_length;
        sequence <byte> IPMP_Data;
        uint isSigned;
        ByteArray Signature;
        uint NumCerts;
        uint CertType;
        CertificateType Certificate;
        guid128 Verifying_Tool_ID;
} ;

typedef ByteArray IPMPControlInfoDescriptor
typedef ByteArray IPMPData ;
interface MmIIPMPterminal {xx-x-x-x-xxx} {
     boolean getStreamData(out Sequence sequence);
     boolean retriveIPMPInfo(in Sequence sequence);
     boolean retriveMissingTool(in URI remoteToolURI, in guid toolID);
     boolean parseIPMPInfo(in IPMPControlInfoDescriptor ipmpInfo);
     boolean getTools(in guid toolID, out IPMPtoolInstance ti);
     boolean initTool(in guid toolID);
     boolean operateTool(in IPMPDescriptor ipmpInfo,
                         in Stream stream, in IPMPData ipmpData);
     void toolProcessing(in guid toolID);
     void terminateTool(in guid toolID);
     boolean revokeTool(in guid toolID);
}

/**
 * This is interface for operating to be defined by MPEG IPMP.
 *
 **/ interface MmIIPMPTool {xx-x-x-x-xxx} {
     boolean authenticate(in Stream *stream,
                      in IPMPDescriptor ipmpInfom, in IPMPData ipmpData)
     boolean encrypt(in Stream *stream,
                      in    IPMPDescriptor    impmpInfo,    in    IPMPData
ipmpData);
     boolean decrypt(in Stream *stream,
                      in    IPMPDescriptor    impmpInfo,    in    IPMPData
ipmpData);
     boolean embedWatermark(in Stream stream,
                      in    IPMPDescriptor    impmpInfo,    in    IPMPData
ipmpData);
      boolean detectWatermark(in Stream stream,
                      in    IPMPDescriptor    impmpInfo,    in    IPMPData
ipmpData);
}

/**
 * This interface is for updating Tool.
 */ interface MmIIPMPToolupdate {xx-x-x-x-xxx} {
     boolean vaildateToolCondition (in ToolInfoDescriptor toolInfo);
      boolean requestUpdate(in URI remoteToolURI, in guid ToolID);
     boolean updateTool(in URI remoteToolURI, in guid ToolID);
}

/**
 * This interface is for communicate between a both of tools.
 */ interface MmIIPMPToolCommunication {xx-x-x-x-xxx} {
     boolean sendMessage(in guid targetID, in Message message);
     boolean receiveMessage(in guid sourceID, in Message message);
}
```

DIGITAL BROADCASTING RECEIVER FOR PROTECTION OF BROADCASTING CONTENTS AND THE METHOD THEREOF

TECHNICAL FIELD

The present invention relates to a digital broadcasting receiver and method of broadcast content protection, and more particularly, to a digital broadcasting receiver and method which apply a middleware interface for broadcast content protection.

BACKGROUND ART

Digital Broadcasting receivers are apparatuses which enable a user to receive broadcast data through a broadcasting network and use the broadcast data according to consumption policy. Here, the broadcast data includes broadcast content, such as video, audio, or data, and protection management information which enables the broadcast data to be used according to the consumption policy. The consumption policy is a policy that allows an authorized user to normally use the broadcast content. That is, the consumption policy is a policy about access to enable the use of the broadcast content.

Meanwhile, the digital broadcasting receivers have a hardware structure and software structure different from each other. Also, the consumption policy differs based on broadcast content. Accordingly, to support these various environments, middleware is required which supports various applications and a middleware interface for the middleware should be defined.

DETAILED DESCRIPTION OF THE INVENTION

Technical Problem

The present invention provides a digital broadcasting receiver and method which enable a user to safely and rightfully access broadcast content using a broadcast content protection management interface, which is a middleware interface, while accepting various broadcast content protection and management policies in various digital broadcasting receivers having different hardware and software structures.

Technical Solution

According to an aspect of the present invention, there is provided a digital broadcasting receiver for broadcast content protection, the digital broadcasting receiver including: a platform which stores received broadcast data; middleware which comprises an application manager managing various applications so that broadcast content corresponding to the received broadcast data is used according to a consumption policy; a platform interface unit which acts as an interface between the platform and the middleware; and a middleware interface unit which acts as an interface between the various applications and the middleware.

The application manager may include: a tool detector which detects tool information related to protection management of the broadcast content included in the received broadcast data based on the received broadcast data; and a tool operator which operates a protection management tool that corresponds to the detected tool information.

The application manager may further include a tool remover which removes information on the protection management tool, which has finished operating, from an operation tool list containing information on the operating protection management tool.

The tool detector may include: a data obtainer which is provided with the broadcast data from the platform; a protection management information searcher which searches for protection management information related to the protection management of the broadcast content from the obtained broadcast data; and a tool information detector which detects tool information related to the protection management of the broadcast content by analyzing the protection management information.

The tool operator may include: a registration determiner which determines whether a protection management tool corresponding to the detected tool information is registered; an initiating unit which initiates the registered protection management tool; and an operator which operates the initiated protection management tool.

The tool operator may further include a tool obtainer which obtains a protection management tool corresponding to the detected tool information through the platform when the protection management tool corresponding to the detected tool information is not registered, and registers the obtained protection management tool by installing the obtained protection management tool.

According to another aspect of the present invention, there is provided a method of broadcast content protection in a digital broadcasting receiver comprising a platform, middleware, and various applications, the method including: the platform storing received broadcast data; and the middleware managing the various applications so that broadcast content corresponding to the received broadcast data is used according to a consumption policy, through a platform interface which acts as an interface between the middleware and the platform and a middleware interface which acts as an interface between the middleware and the various applications.

The managing of the various applications may include: detecting tool information related to protection management of broadcast content contained in the broadcast data, based on the received broadcast data; and operating a protection management tool that corresponds to the detected tool information.

The managing of the various applications may further include removing information on the protection management tool, which has finished operating, from an operation tool list containing information on the operating protection management tool.

The detecting of the tool information may include: being provided with the broadcast data from the platform; searching for protection management information related to the protection management of the broadcast content from the obtained broadcast data; and detecting tool information related to the protection management of the broadcast content by analyzing the protection management information.

The operating of the protection management tool may include: determining whether a protection management tool corresponding to the detected tool information is registered; initiating the registered protection management tool; and operating the initiated protection management tool.

The operating of the protection management tool may further include obtaining a protection management tool corresponding to the detected tool information through the platform when the protection management tool corresponding to the detected tool information is not registered, and registering the obtained protection management tool by installing the obtained protection management tool.

DESCRIPTION OF THE DRAWINGS

FIG. 5 illustrates a middleware interface defined by Interface Definition Language (IDL) according to an embodiment of the present invention.

MODE OF THE INVENTION

Hereinafter, the present invention will be described more fully with reference to the accompanying drawings, in which exemplary embodiments of the invention are shown.

Figure 1:
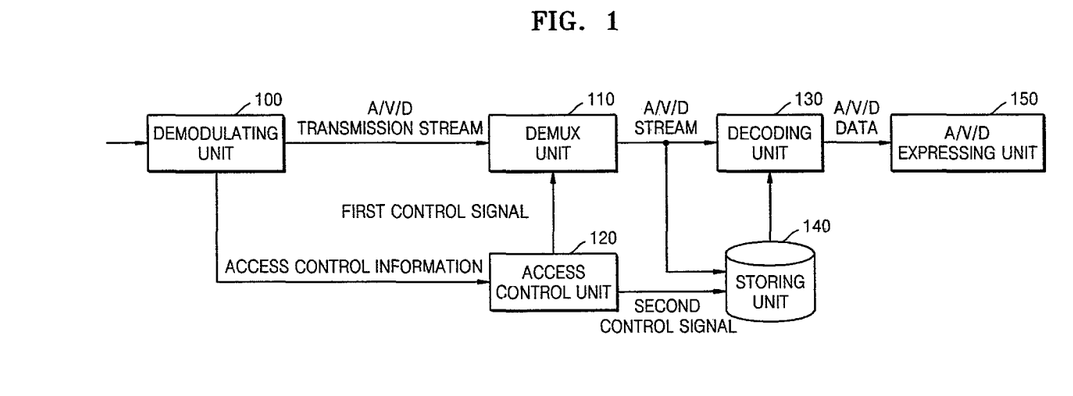
FIG. 1 is a diagram illustrating a structure of a digital broadcasting receiver.

FIG. 1 is a diagram illustrating a structure of a digital broadcasting receiver.

Referring to FIG. 1, a demodulating unit 100 receives broadcast data, provides multiplexed audio/video/data transmission streams to a DEMUX (demultiplexer) unit 110 and provides access control information on the multiplexed audio/video/data transmission streams to an access controlling unit 120.

The DEMUX unit 110 separates the multiplexed audio/video/data transmission streams into separate element streams and provides each element stream to a decoding unit 130 and a storing unit 140.

The access control unit 120 generates a first control signal which can control each element stream and a second control signal related to the storing of the element streams, according to a consumption policy corresponding to the current transmission stream, based on the access control information. Accordingly, the access control unit 120 provides the first control signal to the DEMUX unit 110 and the second control signal to the storing unit 140.

The decoder unit 130 decodes the element streams provided by the storing unit 140 or the DEMUX unit 110 and provides audio/video data, which is the result of the decoding, to an A/V/D expressing unit 150.

The A/V/D expressing unit 150 expresses the provided audio/video data to a user.

Meanwhile, broadcast service providers, who provide various broadcast services, each apply a specific consumption policy on protecting and managing broadcast content. Accordingly, it is impossible for a current digital broadcasting receiver to receive all of these various protection and management policies. Subsequently, ISO/ITU JTG 1 SC29/WG11 MPEG prepared a framework to apply various multimedia content protection management policies by providing a standard called MPEG Intellectual Property Management and Protection (IPMP).

Using the IPMP technique, distribution of content between various content providers and users can be done safely and easily based on a digital right management (DRM) structure.

Figure 2:
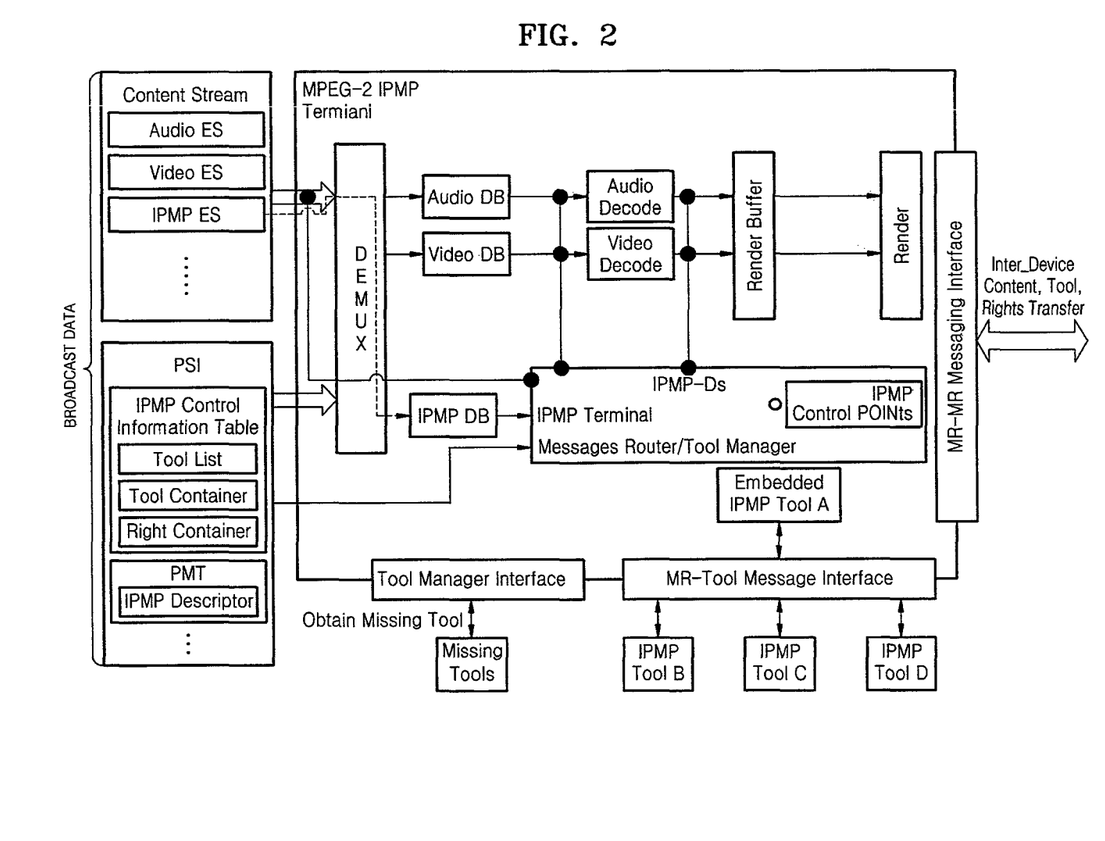
FIG. 2 is a diagram showing a concept of a digital broadcasting receiver for Intellectual Property Management and Protection (IPMP)

FIG. 2 is a diagram showing a concept of a digital broadcasting receiver for IPMP.

In FIG. 2, sections connected to an IPMP terminal are sections where a consumption policy can be applied before a user uses multimedia content. In other words, each connected section is where the IPMP terminal can access and control multiplexed MPEG-2 transmission streams, video/audio streams, and video/audio data.

For example, in the case of a MPEG-2 transmission stream, a consumption policy can be specified on header information of the MPEG-2 transmission stream. In the case of a video/audio stream, a policy which can decode each encoded stream can be applied. Also, in the case of video/audio data which passed through a decoder, the IPMP terminal can apply a policy which can detect transformation, reproduction, or the like of the video/audio data using signature information, watermark information, etc. contained in the video/audio data.

Figure 3:
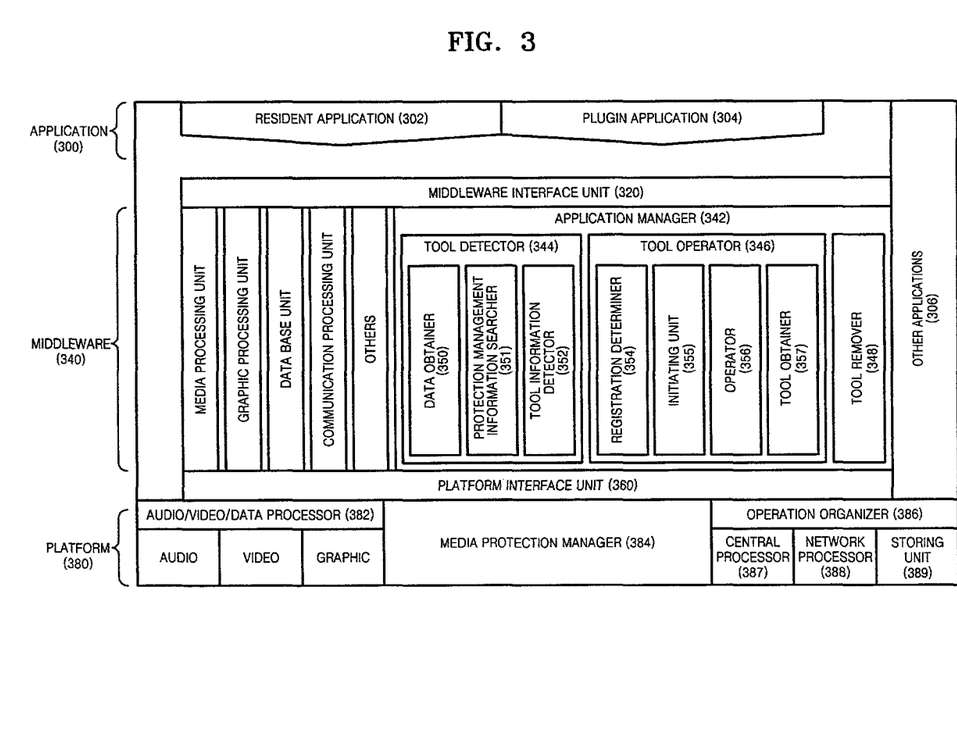
FIG. 3 is a diagram illustrating a structure of a digital broadcasting receiver applying a middleware interface for broadcast content protection according to an embodiment of the present invention.

FIG. 3 is a diagram illustrating a structure of a digital broadcasting receiver applying a middleware interface for broadcast content protection according to an embodiment of the present invention. Referring to FIG. 3, the digital broadcasting receiver according to the current embodiment of the present invention includes an application 300, a middleware interface unit 320, middleware 340, a platform interface unit 360, and a platform 380.

That is, the digital broadcasting receiver includes an application manager 342 in order to control a protection management policy for application and broadcast content through a middleware API layer.

The platform 380 of the digital broadcasting receiver includes an audio/video/data processor 382, a media protection manager 384, and an operation organizer 386.

The audio/video/data processor 382 embodies an audio decoding function, a video decoding function, and a graphic processing function in hardware.

The operation organizer 386 manages the entire operation of the digital broadcasting receiver using support from a central processor 387, a network processor 388, and a storing unit 389.

The platform 380 stores received broadcast data, for example, in the storing unit 389, but it is not limited thereto. Hereinafter, a structure providing the received broadcast data shall be called an initiator for convenience.

The media protection manager 384 protects and manages broadcast content from among the broadcast data stored in the platform 380.

The application 300 includes a resident application 302, a plugin application 304, and other applications 306. The IPMP terminal exists in a form of the resident application 302. Also, various protection management tools exist in a form of the resident application 302 or the plugin application 304, and are supported by the middleware 340 by using a middleware application programming interface (API).

The middleware 340 exists to ensure compatibility between various platforms and various applications, and supports detailed operation of the various applications through the middleware interface unit 320. The middleware interface unit 320 acts as an interface between the resident application 302, the plugin application 304, and the middleware 340 in the middleware API form.

The IPMP terminal is installed in the resident application 302 form, and performs a protection management function corresponding to a consumption policy of broadcast content based on support from the middleware 340.

Referring to FIG. 3, the middleware 340 specifically includes the application manager 342 to support consumption according to a consumption policy of the broadcast content.

In FIG. 3, the application manager 342 includes a tool detector 344, a tool operator 346, and a tool remover 348.

The tool detector 344 detects tool information related to protection management of the current broadcast content, based on received broadcast data. Referring to FIG. 3, the tool detector 344 includes a data obtainer 350, a protection management information searcher 351, and a tool information detector 352.

The data obtainer 350 is provided with all or part of the received broadcast data from the platform 380 through the platform interface unit 360.

The protection management information searcher 351 searches for protection management information related to the protection management of the current broadcast content from among the broadcast data.

The tool information detector 352 analyzes the protection management information and detects tool information related to the protection management of the current broadcast content.

The tool operator 346 operates a protection management tool corresponding to the detected tool information. Referring to FIG. 3, the tool operator 346 includes a registration determiner 354, an initiating unit 355, an operator 356, and a tool obtainer 357. The registration determiner 354 determines whether a protection management tool corresponding to the detected tool information is registered.

The tool obtainer 357 obtains a protection management tool corresponding to the detected tool information through the platform 380 when the protection management tool corresponding to the detected tool information is not registered, and registers the obtained protection management tool by installing the obtained protection management tool. The initiating unit 355 initiates the protection management tool corresponding to the detected tool information. The operator 356 operates the initiated protection management tool.

The tool remover 348 receives completion information of the operating protection management tool and removes the operating protection management tool from an operating operation tool list.

Meanwhile, the protection management tool is installed in the resident application 302 form or the plugin application 304 form, and operates according to a command from the operator 346. In detail, the protection management tool performs a corresponding tool processing function, an authentication function, an encrypt function, a decrypt function, a watermark embedding function, a watermark detecting function, or the like by receiving support from the middleware 340 by using middleware API, such as toolprocessing( ), authentication( ), encyript( ), decrypt( ), embedWatermark( ), or detectWatermark( ). When the protection management tool finishes operating, information on tool operation termination is provided to the application manager 342 using terminateTool( ), which is middleware API. Accordingly, the tool remover 348 of the application manager 342 receives the information on tool operation termination and removes the operating tool from the operating operation tool list.

Figure 4:
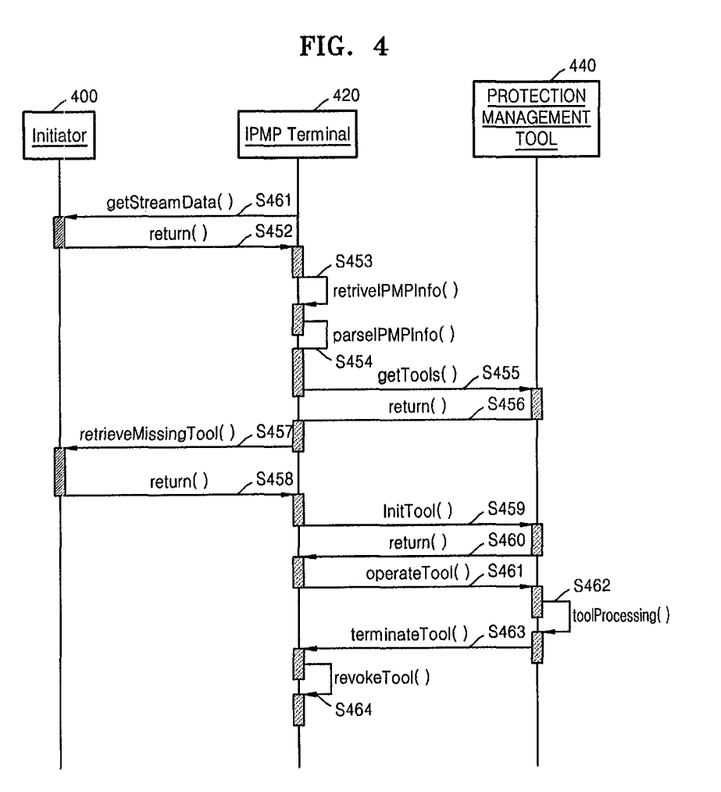
FIG. 4 is a flowchart illustrating a method of broadcast content protection in a digital broadcasting receiver applying a middleware interface for broadcast content protection according to an embodiment of the present invention.

FIG. 4 is a flowchart illustrating a method of broadcast content protection in a digital broadcasting receiver applying a middleware interface for broadcast content protection according to an embodiment of the present invention. Referring to FIG. 4, the method according to the current embodiment of the present invention is formed of time sequential operations performed in the digital broadcasting receiver for the broadcast content protection shown in FIG. 3. Accordingly, details described about the digital broadcasting receiver for broadcast content protection in FIG. 3 can also be applied in the method of broadcast content protection in a digital broadcasting receiver according to the current embodiment of the present invention.

In other words, FIG. 4 illustrates how the application manager 342 operates by using the middleware API layer. As shown in FIG. 4, middleware API of the application manager 342 defines an interface between an initiator 400, an IPMP terminal 420, and a protection management tool 440. Various protection management tools operate through the interface, according to a consumption policy of broadcasting content.

Referring to FIG. 4, in operations S450 and S452, the IPMP terminal 420 ensures that the data obtainer 350 is provided with all or part of the broadcasting data received from the initiator 400 through the platform interface unit 360, using middleware API named getStreamData( ) and return( ).

In operation S453, the IPMP terminal 420 makes the tool information detector 352 analyze the protection management information and detect tool information related to protection management of the current broadcasting content, using middleware API named retrievelPMPInfo( ).

In operation S454, the IPMP terminal 420 makes the protection management information searcher 351 search for protection management information related to protection management of the current broadcast content from the broadcast data, using middleware API named parseIPMPInfo( ).

In operations S455 and S456, the IPMP terminal 420 makes the registration determiner 354 determine whether a protection management tool corresponding to the detected tool information is registered, using middleware API named getTools( ) and return( ).

In operations S457 and S458, the IPMP terminal 420 makes the tool obtainer 357 obtain a protection management tool corresponding to the detected tool information through the platform 380 and then register the obtained protection management tool by installing the obtained protection management tool, using middleware API named retrieveMissingTool( ) and return( ), when it is determined that a tool corresponding to the detected tool information is not registered.

In operations S459 and S460, the IPMP terminal 420 makes the initiating unit 355 perform initiation so that the protection management tool 440 can properly operate, using middleware API named initTool( ).

In operation S461, the IPMP terminal 420 makes the operator 356 operate the initiated protection management tool 440 using middleware API named operateTool( ). At this time, the application manager 342 includes the currently operating protection management tool in the operation tool list.

In operation S462, the protection management tool 440 performs the corresponding work by receiving support from the application manager 342 using middleware API named toolProcessing( ). In operation S463, termination information of the operating protection management tool 440 is transmitted to the application manager 342 and the IPMP terminal 420 using middleware API named terminateTool( ).

In operation S464, the IPMP terminal 420 makes the tool remover 348 receive termination information of the operating protection management tool and remove the operating protection management from the operating operation tool list, using middleware API named revokeTool( ).

FIG. 5 illustrates a middleware interface defined by Interface Definition Language (IDL) according to an embodiment of the present invention. A protection management tool application can be expressed as shown below, using the middleware interface defined by IDL according to the current embodiment of the present invention.

```
App_tool( ) {
   toolProcessing( );
   while(!detectWatermark( ));
   terminateTool( );
}
```

The protection management tool above is a tool application for detecting a watermark contained in broadcast content, and is terminated when the watermark is detected. The protection management tool is generally used in order to use the detected watermark according to a consumption policy before broadcast content is used.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, various broadcast content protection management policies can be easily applied to various digital broadcasting receivers, each having different hardware and software structures. Accordingly, broadcast service providers can provide stable and various broadcast services by deciding on a protection management policy suitable for the broadcast content itself, and not by deciding on a protection management policy considering a digital broadcasting receiver.

The invention claimed is:

1. A digital broadcasting receiver for broadcast content protection, the digital broadcasting receiver comprising:
   a computer system comprising a processor and memory, the memory including:
   a platform operating on the computer system and configured to store received broadcast data;
   middleware which comprises an application manager operating on the computer system and configured to manage various protection management tools based on protection management information from the broadcast data so that broadcast content corresponding to the received broadcast data is used according to a consumption policy,
   wherein the application manager is configured to manage a tool operator which operates a protection management tool that corresponds to a detected tool information, wherein the tool operator is configured to manage:
   a registration determiner which determines whether a protection management tool corresponding to the detected tool information is registered;
   an initiating unit which initiates the registered protection management tool;
   an operator which operates the initiated protection management tool; and
   a tool obtainer which obtains the protection management tool corresponding to the detected tool information through the platform when the protection management tool corresponding to the detected tool information is not registered, and registers the obtained protection management tool by installing the obtained protection management tool;
   a platform interface unit operating on the computer system and configured to provide an interface between the platform and the middleware;
   a protection management information searcher which searches for protection management information related to a protection management of the broadcast content from the broadcast data;
   a tool information detector which detects tool information related to the protection management of the broadcast content by analyzing the protection management information; and
   a middleware interface unit operating on the computer system and configured to provide an interface between the various protection management tools and the middleware,
   wherein the protection management tool comprises a registered protection management tool and an unregistered protection management tool.

2. The digital broadcasting receiver of claim 1, wherein the application manager is further configured to manage:
   a tool detector which detects tool information related to protection management of the broadcast content included in the received broadcast data based on the received broadcast data.

3. The digital broadcasting receiver of claim 2, wherein the application manager is configured to manage a tool remover which removes information on the protection management tool, which has finished operating, from an operation tool list containing information on the operating protection management tool.

4. The digital broadcasting receiver of claim 2, wherein the tool detector is configured to manage a data obtainer which is provided with the broadcast data from the platform.

5. The digital broadcasting receiver of claim 1, wherein the middleware interface unit is configured to manage a protection management interface, which interfaces at least one performance function from among search for protection management information, search for tool information, obtain a tool, search for an unregistered tool, initiate a tool, operate a tool, terminate a tool, and revoke a tool.

6. The digital broadcasting receiver of claim 1, wherein the middleware interface unit is configured to manage a protection management interface, which interfaces at least one performance function of user authentication, encoding, decoding, watermark embedment, and watermark detection by the protection management tool.

7. The digital broadcasting receiver of claim 1 wherein the middleware provides compatibility between the platform and the various protection management tools.

8. A method of broadcast content protection in a digital broadcasting receiver comprising a platform, middleware, and various protection management tools, the method comprising:

storing received broadcast data by the platform;

managing the various protection management tools by the middleware based on protection management information from the broadcast data so that broadcast content corresponding to the received broadcast data is used according to a consumption policy, through a platform interface which provides an interface between the middleware and the platform and a middleware interface, wherein the middleware interface provides an interface between the middleware and the various protection management tools;

detecting tool information related to protection management of broadcast content contained in the broadcast data, based on the received broadcast data; and operating a protection management tool that corresponds to the detected tool information, managing a tool operator which operates a protection management tool that corresponds to the detected tool information wherein the tool operator determines whether a protection management tool corresponding to the detected tool information is registered;
 initiates the registered protection management tool;
 operates the initiated protection management tool;
 obtains a protection management tool corresponding to the detected tool information through the platform when the protection management tool corresponding to the detected tool information is not registered; and registers the obtained protection management tool by installing the obtained protection management tool.

9. The method of claim 8, wherein the managing of the various applications further comprises removing information on the protection management tool, which has finished operating, from an operation tool list containing information on the operating protection management tool.

10. The method of claim 8, wherein the detecting of the tool information comprises:

being provided with the broadcast data from the platform;
searching for protection management information related to the protection management of the broadcast content from the obtained broadcast data; and
detecting tool information related to the protection management of the broadcast content by analyzing the protection management information.

11. The method of claim 8 further comprising recording a program of the recited methods on a non-transitory computer readable recording medium.

12. A middleware interface for IPMP(Intellectual Property Management and Protection) comprising:

a computer system comprising a processor and memory, the memory including:
a protection management information search interface operating on the computer system and configured to interface a function for retrieving for protection management information of broadcast content from obtained broadcast data;
a tool information detect interface operating on the computer system and configured to interface a function for detecting tool information required in performing protection management of the broadcast content by analyzing the protection management information;
a tool obtainment interface operating on the computer system and configured to interface a function for obtaining a protection management tool corresponding to the tool information;
a tool initiation interface operating on the computer system and configured to interface a function for initiating the obtained protection management tool;
a tool operation interface operating on the computer system and configured to interface a function for operating the initiated protection management tool;
an application manager configured to manage a tool operator which operates a protection management tool that corresponds to the detected tool information, wherein the tool operator is configured to manage:
 a registration determiner which determines whether a protection management tool corresponding to the detected tool information is registered;
 an initiating unit which initiates the registered protection management tool;
 an operator which operates the initiated protection management tool; and
 a tool obtainer which obtains a protection management tool corresponding to the detected tool information through the platform when the protection management tool corresponding to the detected tool information is not registered, and registers the obtained protection management tool by installing the obtained protection management tool,
wherein the middleware interface provides an interface between various protection management tools and middleware managing the protection management tools in a digital broadcast receiver for broadcast content protection.

13. The middleware interface of claim 12, further comprising a missing tool search interface operating on the computer system and configured to interface a function for retrieving the protection management tool corresponding to the tool information from a platform, when the protection management tool corresponding to the tool information is not registered.

14. The middleware interface of claim 12, further comprising a tool termination and revoke interface operating on the computer system and configured to interface a function for removing information on the protection management tool, which has terminated operating, from an operation tool list containing information on the operating protection management tool.

15. The middleware interface of claim 12, wherein the protection management tool comprises an authentication tool operating on the computer system and adapted configured to authenticate a user or an apparatus based on the tool information.

16. The middleware interface of claim 12, wherein the protection management tool comprises an encoding tool operating on the computer system and configured to encode data according to an encoding method included in the tool information.

17. The middleware interface of claim 12, wherein the protection management tool comprises a decoding tool operating on the computer system and configured to decode data according to a decoding method included in the tool information.

18. The middleware interface of claim 12, wherein the protection management tool comprises a watermark tool operating on the computer system and configured to embed or detect a watermark according to a method included in the tool information.

* * * * *